United States Patent [19]

Shekleton

[11] Patent Number: 5,115,637
[45] Date of Patent: May 26, 1992

[54] EXTERNAL CARTRIDGE GAS COMBUSTOR IGNITOR

[75] Inventor: Jack R. Shekleton, San Diego, Calif.

[73] Assignee: Sundstrand Corporation, Rockford, Ill.

[21] Appl. No.: 455,270

[22] Filed: Dec. 22, 1989

[51] Int. Cl.⁵ .......................... F02C 7/264; F02C 7/27
[52] U.S. Cl. .......................... 60/39.142; 60/39.823
[58] Field of Search .......... 60/39.142, 39.823, 39.824, 60/39.825, 745

[56] References Cited

U.S. PATENT DOCUMENTS

| | | | |
|---|---|---|---|
| 1,173,326 | 2/1916 | Taylor | 92/31 |
| 2,673,445 | 3/1954 | Bruckmann | 60/39.141 |
| 2,982,095 | 5/1961 | Campbell | 60/39.142 |
| 2,985,104 | 5/1961 | Fox | 60/39.142 |
| 3,099,016 | 7/1963 | Edwards | 137/533.13 |
| 3,234,746 | 2/1966 | Cope | 417/404 |
| 3,381,471 | 5/1968 | Szydlowski | 60/745 |
| 3,628,638 | 12/1971 | Curchack | 92/31 |
| 3,700,359 | 10/1972 | Vanderjagt | 417/528 |
| 3,775,028 | 11/1973 | Davis | 417/404 |
| 3,901,129 | 8/1975 | Butterworth | 91/299 |
| 4,161,102 | 7/1979 | Jasas et al. | 60/39.142 |
| 4,209,285 | 6/1980 | Josinski | 417/571 |
| 4,693,073 | 9/1987 | Blackburn | 60/39.142 |
| 4,712,371 | 12/1987 | Weber | 60/39.142 |

FOREIGN PATENT DOCUMENTS 1550530 9/1969 Fed. Rep. of Germany ........................ 137/533.15

Primary Examiner—Louis J. Casaregola
Attorney, Agent, or Firm—Wood, Phillips, Mason Recktenwald & VanSanten

[57] ABSTRACT

In order to assist in starting a gas turbine engine (10), hot pressurized exhaust gases are supplied through relatively large hot gas supply tubes (22) for direct impingement on turbine blades (14) to drive a turbine rotor (12). The relatively large hot gas supply tubes (22) are located in immediate proximity to a flame zone (32) of a combustor (16). This proximate location of the relatively large hot gas supply tubes (22) facilitates diversion of a small amount of hot pressurized, exhaust gases to the flame zone (32) through a flow control orifice (28) for the purpose of initiating ignition in the combustor (16) wherein the BTU energy of the exhaust gases is transferred to the combustor (16) during the starting thereof. The relatively large hot gas supply tubes (22) ensure a high mass flow rate of hot pressurized exhaust gases with some being directed to the flame zone (32) in a manner minimizing heat loss which enhances ignition reliability. Through the utilization of the present invention electrically activated ignitors may be eliminated.

15 Claims, 1 Drawing Sheet

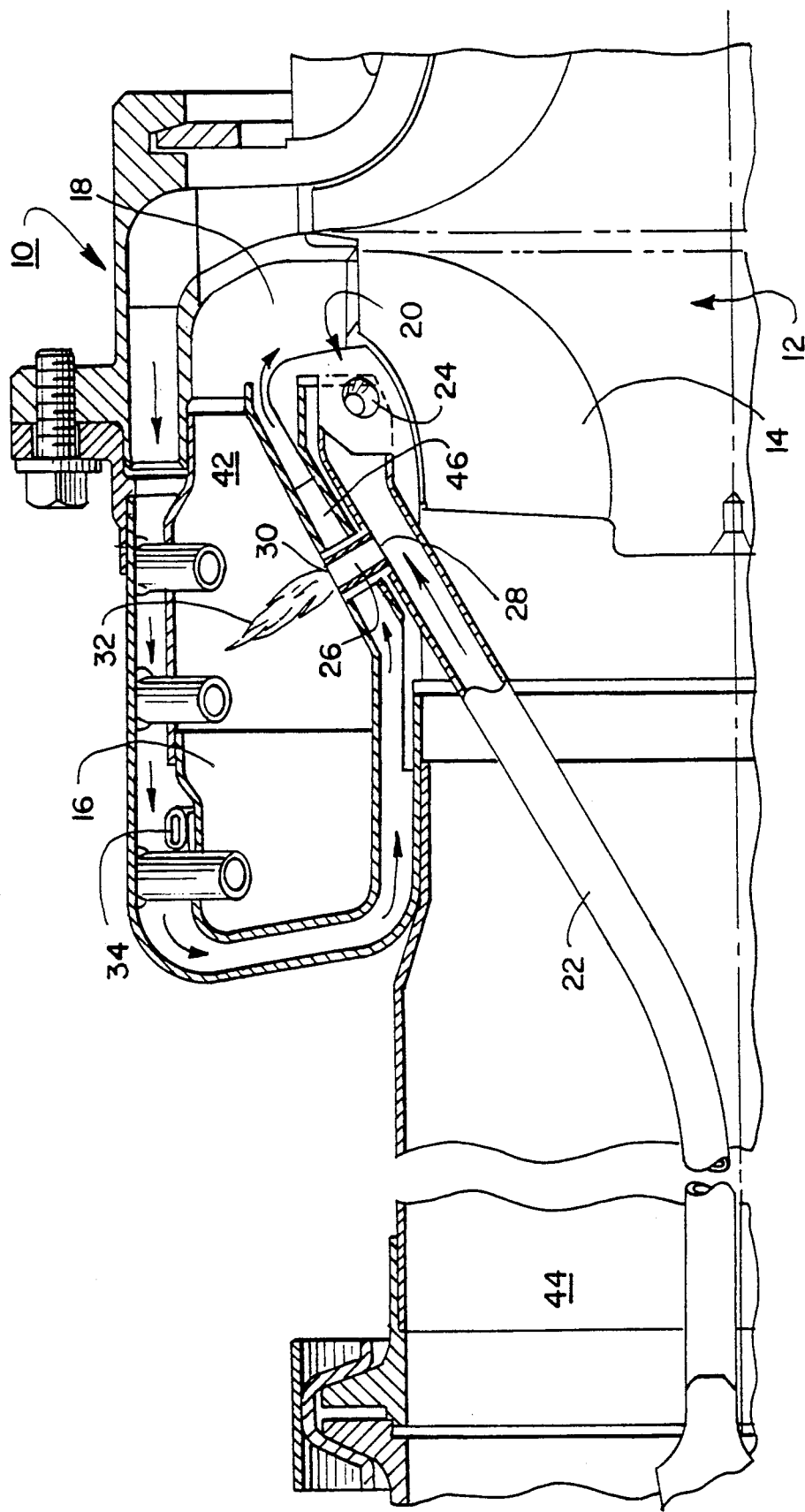

EXTERNAL CARTRIDGE GAS COMBUSTOR IGNITOR

FIELD OF THE INVENTION

The present invention is generally directed to a gas turbine engine which includes a combustor having a combustion chamber for generating hot gases of combustion for driving a turbine. More particularly, the present invention is directed to the utilization of multiple large gas supply tubes which are located immediately adjacent to the combustion chamber for delivering hot, pressurized gases for direct impingement on a radial turbine for the purpose of assisting with the starting of the gas turbine engine wherein some of the BTU energy of the hot, pressurized gases is transferred to the flame zone of the combustor. In addition, the present invention is directed to the utilization of a separate gas supply tube to thereby eliminate the requirement of having a separate, electrically-activated pyrotechnic ignitor.

BACKGROUND OF THE INVENTION

Conventional gas turbine engines require a substantial amount of external energy during initial startup. This is necessary in order to achieve the optimum operating speed wherein the turbine engine will sustain continued combustion. In most applications, it is known to be an important requirement for the turbine engine to start quickly and reliably.

Accordingly, gas turbine engines typically require a separate ignitor for igniting the flame. In certain circumstances, an electrically-activated pyrotechnic ignitor is preferred when economies of scale dictate this alternative starting approach. This approach will be less expensive, require less space, and weigh less than a conventional ignitor.

One approach for starting gas turbine engines which is routinely utilized is the use of a self-contained independent source of hot, pressurized exhaust gases for impingement upon turbine blades for driving the turbine rotor during the starting procedure. Independently, but simultaneously therewith, ignition is achieved within the combustion chamber either electrically or by the use of hot, pressurized exhaust gases from a separately ignited pyrotechnic. Often, the BTU energy loss during transfer of the hot exhaust gases from the conventional start cartridge by way of a small transfer line to the combustor of the turbine engine is substantial and prevents ignition from occurring. Consequently, the hot exhaust gases from the separately ignited pyrotechnic must not lose any of their BTU energy prior to injection into the combustion chamber in order to have a reliable starting process for the turbine engine. Also, for safe and reliable operation during the starting process, it is necessary that all exhaust gas sources and combustion chamber ignition operate and occur almost simultaneously without fail.

As a result of the above-mentioned factors, previously known starting systems for gas turbine engines have been designed as a compromise between reliability, cost, and multi-start capability for a specific turbine engine. It would be desirable to have a less expensive and inherently reliable approach to starting a turbine engine. More specifically, it would be desirable to have an entirely satisfactory separately ignited pyrotechnic approach to thereby eliminate the expensive requirement of having a separate electrically-activated ignitor to start a gas turbine engine.

The present invention is directed toward overcoming the various problems found in the prior art as recited above.

SUMMARY OF THE INVENTION

Accordingly, it is a primary object of the present invention to provide an improved external hot gas supply cartridge ignitor for purposes of starting a gas turbine engine thereby eliminating the more costly alternative of using a separate, electrically-activated ignitor. Another object of the present invention is to provide a reliable, less expensive arrangement for starting a turbine engine that is presently found in the prior art. It is another object of the present invention to provide an improved arrangement for starting a turbine engine which is capable of being utilized for starting systems having an external hot gas supply cartridge by providing means for minimizing heat loss in the transfer of the hot, pressurized exhaust gases to the combustor.

In practicing the present invention there is provided a turbine engine which has a turbine rotor with impeller blades integral therewith. The turbine engine has an associated combustor for producing hot gases of combustion which communicates with the turbine rotor through a turbine nozzle. With this arrangement, the turbine engine is normally driven by the hot gases of combustion that are produced by the combustor.

In accordance with the present invention, auxiliary means is associated with the turbine rotor for assisting the combustor in the starting of the turbine engine. The auxiliary means includes a self-contained independent source of hot, pressurized gases, and means for directing the pressurized hot gases with sufficient mass flow so as not to sustain a substantial loss of BTU energy as the gases travel from the self-contained independent source to the turbine rotor. Further, the present invention includes means for simultaneously facilitating diversion of a portion of the hot, pressurized gases into the flame zone of the combustor of the turbine engine at a predetermined location.

Typically, the hot gases are at a temperature on the order of around 2200° F.

Other objects, advantages and features of the present invention will become apparent from a consideration of the following specification taken in conjunction with the accompanying drawing.

BRIEF DESCRIPTION OF THE DRAWING

The drawing is a fragmentary sectional view, partly schematic, illustrating the elements of a turbine engine in accordance with the present invention wherein the illustrated arrows depict the flow of hot, pressurized exhaust gases to a turbine rotor and to an internal flame zone of a combustor.

DESCRIPTION OF THE PREFERRED EMBODIMENT

The present invention can be better understood by reference to the accompanying drawing taken in conjunction with the following discussion. Referring now to the drawing, the elements of a gas turbine engine 10 constructed in accordance with the present invention are illustrated wherein the arrows depict the flow of hot, pressurized exhaust gases to a turbine rotor 12 and to an internal flame zone 32 of a combustor 16. While the preferred embodiment of the invention is directed toward a gas turbine engine 10, it is important to note that the present invention may be used in the starting of any conventional turbine engine.

As shown, the turbine rotor 12 has turbine blades 14 integral therewith, and in communication with the combustor 16 which is operative to produce hot gases of combustion. The combustor 16 communicates with the turbine rotor 12 through a turbine nozzle 18. During operation of the gas turbine engine 10, the engine 10 is driven by the hot gases of combustion produced by the combustor 16, i.e., the hot gases of combustion drive the turbine rotor 12 as they pass through the turbine blades 14. The gas turbine engine 10 is formed such that the turbine nozzle 18 is defined by a turbine shroud 20 which shelters the turbine blades 14 from the hot gases of combustion.

In a conventional starting system for the gas turbine engine 10, an electrically-activated ignitor is triggered. The conventional ignitor 38 provides the spark or sparks to cause ignition in the combustor 16 during start-up of the gas turbine engine 10. The present invention eliminates the requirement of having an electrically-actuated ignitor for starting the turbine engine 10.

In the present invention, a self-contained independent source of hot gases 50 is provided which includes means for directing the hot gases from the independent source 50 to the turbine blades 14. The means for directing the hot gases from the self-contained independent source 50 includes a pair of transfer tubes such as 22 leading from the independent source 50 to the turbine rotor 12. The hot gas directing means also includes a nozzle 24 which is independently associated with each of the transfer tubes such as 22 (only one of the tubes and nozzles being shown in the drawing). The nozzles 24 are adapted to direct the hot gases from the independent source 50 in a direct impinging fashion against the turbine blades 14. Accordingly, hot gases pass from the source 50 to the turbine blades 14 through the relative large transfer tubes such as 22.

As will be appreciated, this will cause the turbine blades 14 to spin at ever increasing velocity during start-up. This will continue until the turbine rotor 12 achieves an equilibrium velocity of approximately 50% of normal operating velocity. In addition, the combustor 16 is positively and directly assisted in the starting of the gas turbine engine 10.

In this connection, the transfer tubes such as 22 are in immediate proximity to the flame zone 32 of the combustor 16. This proximate location facilitates the diversion of a small portion of the hot gas from the independent source 50 by way of a pair of flow control orifices such as 28 positioned within one end of a secondary supply tube such as 26 connected to each of the respective transfer tubes such as 22. The secondary supply tubes such as 26 have a smaller diameter than the corresponding transfer tube such as 22 such that hot gases will flow from an opening such as 30 at the opposite end of the secondary supply tube into the flame zone 32 of the combustor 16. The location of the transfer tubes such as 22 facilitate the simultaneous diversion of a portion of the hot, pressurized exhaust gases to the flame zone 32 through the flow control orifices such as 28. The relatively large transfer tubes such as 22 ensure that a sufficiently high mass flow rate of hot, pressurized exhaust gases will occur without substantial loss of BTU energy thereby minimizing the heat loss experienced by the hot, pressurized exhaust gases as they pass to the flame zone 32. Accordingly, ignition of the turbine engine 10 is reliably enhanced.

The independent source of hot exhaust gases 50 (conventionally referred to as a start supply cartridge) is mounted and positioned in the exhaust duct 44. The temperature of the hot pressurized exhaust gases which are generated by the start cartridge 50 is on the order of approximately 2200° F. It is important to realize that the transfer tubes such as 22 allow a sufficiently high mass flow rate of hot, pressurized exhaust gases to a point in close proximity to the flame zone 32 so as to minimize heat loss experienced during the transfer of the hot gases to the combustor 16. The very short secondary supply tubes such as 26 are located to communicate with the combustor 16 upstream of a dilution air zone 42 at or very near the flame zone 32. In addition, fuel is injected into the combustor 16 by means of fuel injectors such as 34 upstream of the secondary supply tubes such as 26 and well upstream of the dilution air zone 42.

With the present invention, it has been discovered that a mixture ratio in the combustor 16 at the point at which fuel is injected will be typically on the order of about 10 air-fuels by mass. This or a comparable mixture ratio is advantageous particularly when taken with the sufficiently large transfer tubes such as 22 (which facilitate a high mass flow rate of hot, pressurized exhaust gas while minimizing heat loss experienced from the hot, pressurized exhaust gases flowing from the independent source 50 to enhance ignition reliability once the exhaust gases flow by way of the flow control orifices such as 28 into the flame zone 32 of the combustor 16 at an intermediate point) and the very short secondary supply tubes such as 26 (which introduce a concentrated level of BTU's present in the hot exhaust gases into the combustor 16 by way of the flow control orifices such as 28 also without significant heat loss). Accordingly, combustion will be reliably achieved for the turbine engine 10 despite the relatively lower temperature of the hot, pressurized exhaust gases, i e., on the order of 2200° F. as opposed to around 4000° F. for a conventional electrically-actuated ignitor.

The dilution air zone 42 is a region where dilution air is introduced at or near the turbine nozzle 18 to protect the turbine blades 14 and the turbine rotor 12 from the level of heat generated by the hot gases during initial starting and subsequent combustion within the combustor 16. As will be appreciated by those skilled in the art, the dilution air may be channeled into the combustor 16 in accordance with any of a number of well known techniques after which the dilution air is directed to flow through the turbine nozzle 18 and the turbine blades 14 along with the hot gases of combustion.

As will be appreciated, other assorted details of the turbine engine 10 have been omitted where they are unnecessary for an understanding of the present invention. Such details are conventional and well within the skill of those in the art. Accordingly, it is believed that the ability to understand the present invention is enhanced by focusing solely on the unique features thereof.

From the foregoing, it will be seen that this invention is one well adapted to obtain all of the objects hereinabove set forth together with the other advantages which are inherent to the invention. Since many possible embodiments may be made of the invention without departing from the scope thereof, it is understood that all matters herein set forth and shown in the accompanying drawing are to be interpreted as illustrative and not in a limiting sense. Thus, while the preferred embodiment has been described, variations therein will occur to those skilled in the art without departing from the scope of the present invention which is delineated solely by the following claims.

I claim:

1. In a turbine engine having a turbine rotor, said turbine rotor having turbine blades integral therewith, said turbine engine having a combustor associated therewith for producing hot gases of combustion, said combustor communicating with said turbine rotor through a turbine nozzle, said turbine engine normally being driven by said hot gases of combustion, the improvement comprising:

auxiliary means associated with said turbine rotor for assisting said combustor in starting said turbine engine including a self-contained independent source of hot, pressurized gases, said auxiliary means also including means for directing said hot, pressurized gases from said self-contained independent source to said turbine rotor with sufficient mass flow to avoid substantial loss of energy, said self-contained independent source of hot, pressurized gases being located in an exhaust duct downstream of said turbine rotor; and means for simultaneously facilitating diversion of a portion of said hot, pressurized gases into said combustor at a predetermined location.

2. In a turbine engine having a turbine rotor, said turbine rotor having turbine blades integral therewith, said turbine engine having a combustor associated therewith for producing hot gases of combustion, said combustor communicating with said turbine rotor through a turbine nozzle, said turbine engine normally being driven by said hot gases of combustion, the improvement comprising:

auxiliary means associated with said turbine rotor for assisting said combustor in starting said turbine engine including a self-contained independent source of hot, pressurized gases, said auxiliary means also including means for directing said hot, pressurized gases from said self-contained independent source to said turbine rotor with sufficient mass flow to avoid substantial loss of energy; and means for simultaneously facilitating diversion of a portion of said hot, pressurized gases into said combustor at a predetermined location;

said turbine engine including an exhaust duct disposed downstream of said turbine rotor, said self-contained independent source of hot, pressurized gases comprising a start cartridge mounted in said exhaust duct.

3. The turbine engine as defined in claim 1 wherein said means for directing said self-contained independent source of hot, pressurized gases extends to a point in immediate proximity to said turbine blades.

4. The turbine engine as defined in claim 1 wherein said means for simultaneously facilitating diversion of a portion of said hot, pressurized gases includes conduit means, said conduit means having a smaller diameter than said directing means, said conduit means being located at an intermediate point relative to a flame zone and upstream of a dilution air zone of said combustor.

5. The turbine engine as defined in claim 4 wherein said conduit means is located downstream of a fuel injector for said combustor.

6. The turbine engine as defined in claim 4 wherein said conduit means includes a control orifice of a predetermined size for controlling flow of said hot, pressurized gases passing from said directing means into said flame zone of said combustor.

7. In a turbine engine having a turbine rotor, said turbine rotor having turbine blades integral therewith, said turbine engine having a combustor associated therewith for producing hot gases of combustion, said combustor communicating with said turbine rotor through a turbine nozzle, said turbine engine normally being driven by said hot gases of combustion, the improvement comprising:

auxiliary means associated with said turbine rotor for assisting said combustor in starting said turbine engine including a self-contained independent source of hot, pressurized gases, said self-contained independent source of hot, pressurized gases being located in an exhaust duct downstream of said turbine rotor, and said auxiliary means also including a relatively large diameter supply tube for directing said hot, pressurized gases from said self-contained independent source to said turbine rotor with sufficient mass flow to avoid a substantial loss of energy, said relatively large diameter supply tube being in close proximity to said combustor at least adjacent a flame zone thereof; and means for simultaneously facilitating diversion of a portion of said hot, pressurized gases from said relatively large diameter supply tube into said flame zone of said combustor at a predetermined location in immediate proximity to said flame zone of said combustor.

8. The turbine engine as defined in claim 7 wherein said self-contained independent source of hot, pressurized gases comprises a start cartridge mounted in said exhaust duct.

9. The turbine engine as defined in claim 7 wherein said means for simultaneously facilitating diversion of a portion of said hot, pressurized gases includes a relatively short, small diameter diversion tube, said relatively short, small diameter diversion tube facilitating direct substantially immediate communication between said relatively large diameter supply tube and said combustor at an intermediate point relative to said flame zone upstream of a dilution air zone thereof.

10. The turbine engine as defined in claim 9 wherein said relative small diameter diversion tube is located downstream of a fuel injector for said combustor.

11. The turbine engine as defined in claim 9 wherein said relative small diameter diversion tube includes a control orifice of a predetermined size for controlling flow of said hot, pressurized gases passing from said relative large diameter supply tube into said flame zone of said combustor.

12. The turbine engine as defined in claim 2 wherein said means for directing said hot, pressurized gases extends to a point in immediate proximity to said turbine blades.

13. The turbine engine as defined in claim 2 wherein said means for simultaneously facilitating diversion of a portion of said hot, pressurized gases includes conduit means, said conduit means having a smaller diameter than said directing means, said conduit means being located at an intermediate point relative to a flame zone and upstream of a dilution air zone of said combustor.

14. The turbine engine as defined in claim 13 wherein said conduit means is located downstream of a fuel injector for said combustor.

15. The turbine engine as defined in claim 13 wherein said conduit means includes a control orifice of a predetermined size for controlling flow of said hot, pressurized gases passing from said directing means into said flame zone of said combustor.

* * * * *